United States Patent

Sutton

[15] 3,700,059
[45] Oct. 24, 1972

[54] TANDEM WHEELED VEHICLE WITH STABILIZING APPARATUS

[72] Inventor: Denver Sutton, R.R. 2, Angola, Ind. 46703

[22] Filed: June 11, 1971

[21] Appl. No.: 152,283

[52] U.S. Cl. .....................180/30, 180/21, 280/43.2, 280/293
[51] Int. Cl. ............................................B62d 61/12
[58] Field of Search ..........180/21, 30; 280/43.2, 293

[56] References Cited

UNITED STATES PATENTS 2,398,541   4/1946   Leach...........................180/21
2,750,204   6/1956   Ohrmann..................180/21 X Primary Examiner—Gerald M. Forlenza
Assistant Examiner—George F. Abraham
Attorney—Hood, Gust, Irish, Lundy & Coffey

[57] ABSTRACT

A motor vehicle having wheels arranged in tandem along the longitudinal axis of the vehicle, and which includes a steering mechanism and a supporting frame. The vehicle is provided with a pair of wheels disposed in bilaterally symmetrical spaced-apart relationship to the longitudinal axis of the vehicle and strut means securing the wheels to the vehicle for verticle-swinging movement between retracted and extended positions. There are means coupled between the wheels and the steering mechanism of the vehicle for steering the wheels in synchronism with the vehicle's steering mechanism in all positions of the wheels between their retracted and extended positions. There are also provided motor means for moving the wheels between their retracted and extended positions, and switch means for selectively operating the motor means to retract and extend the wheels.

14 Claims, 14 Drawing Figures

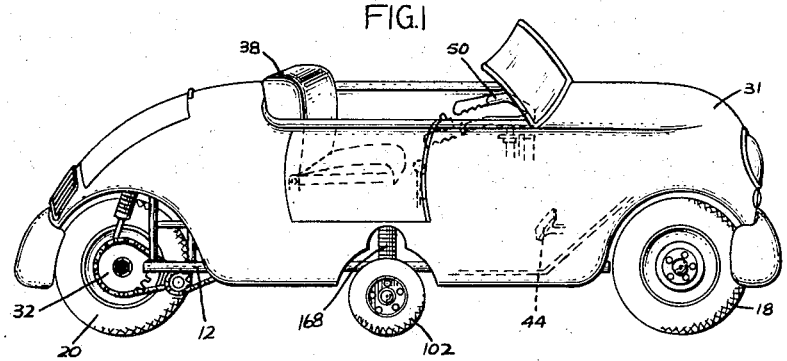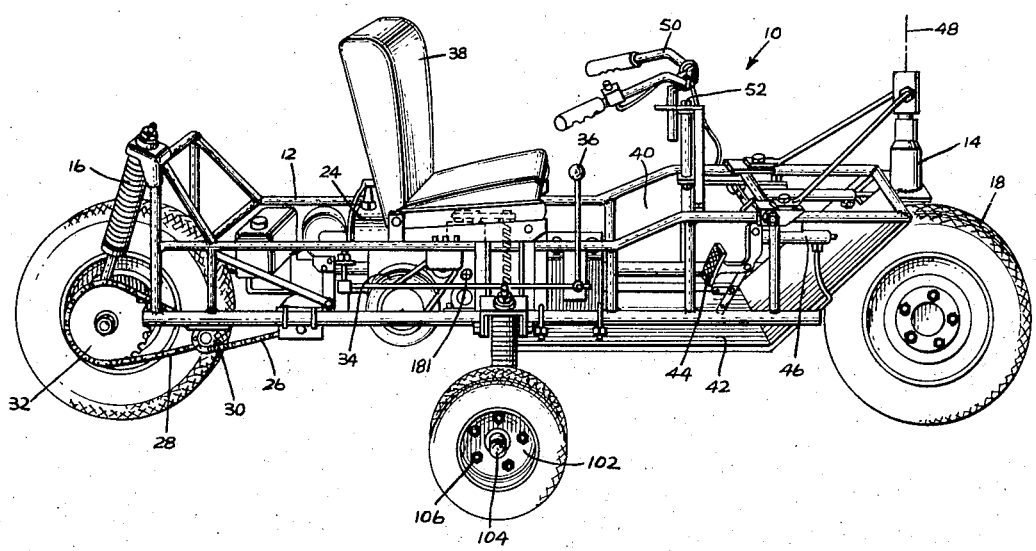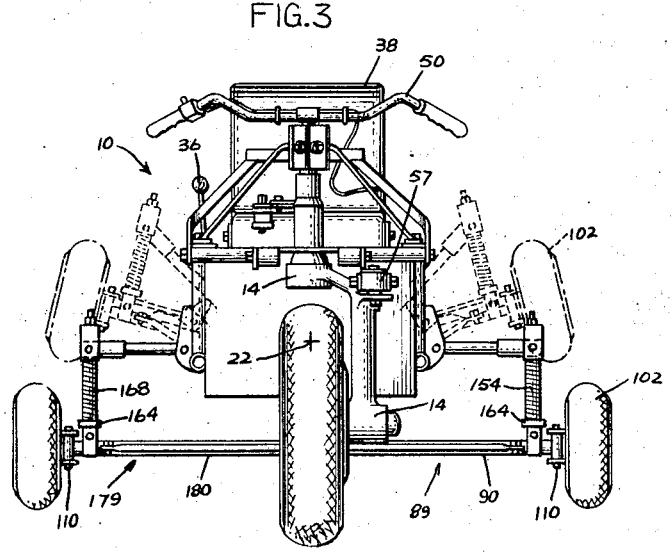

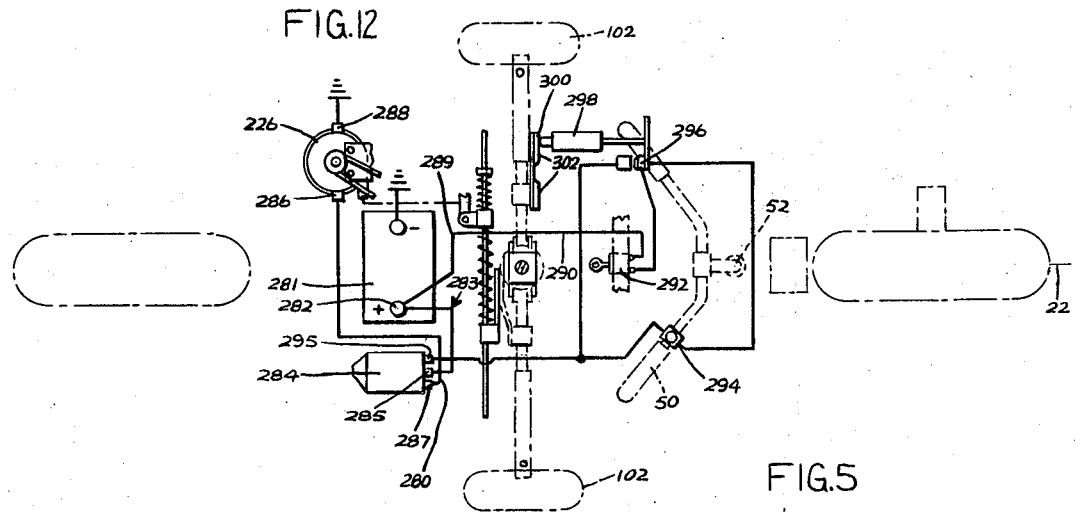
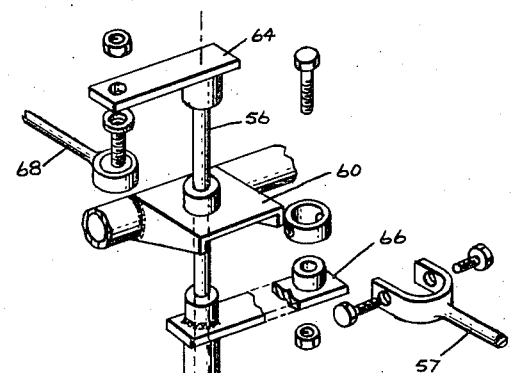
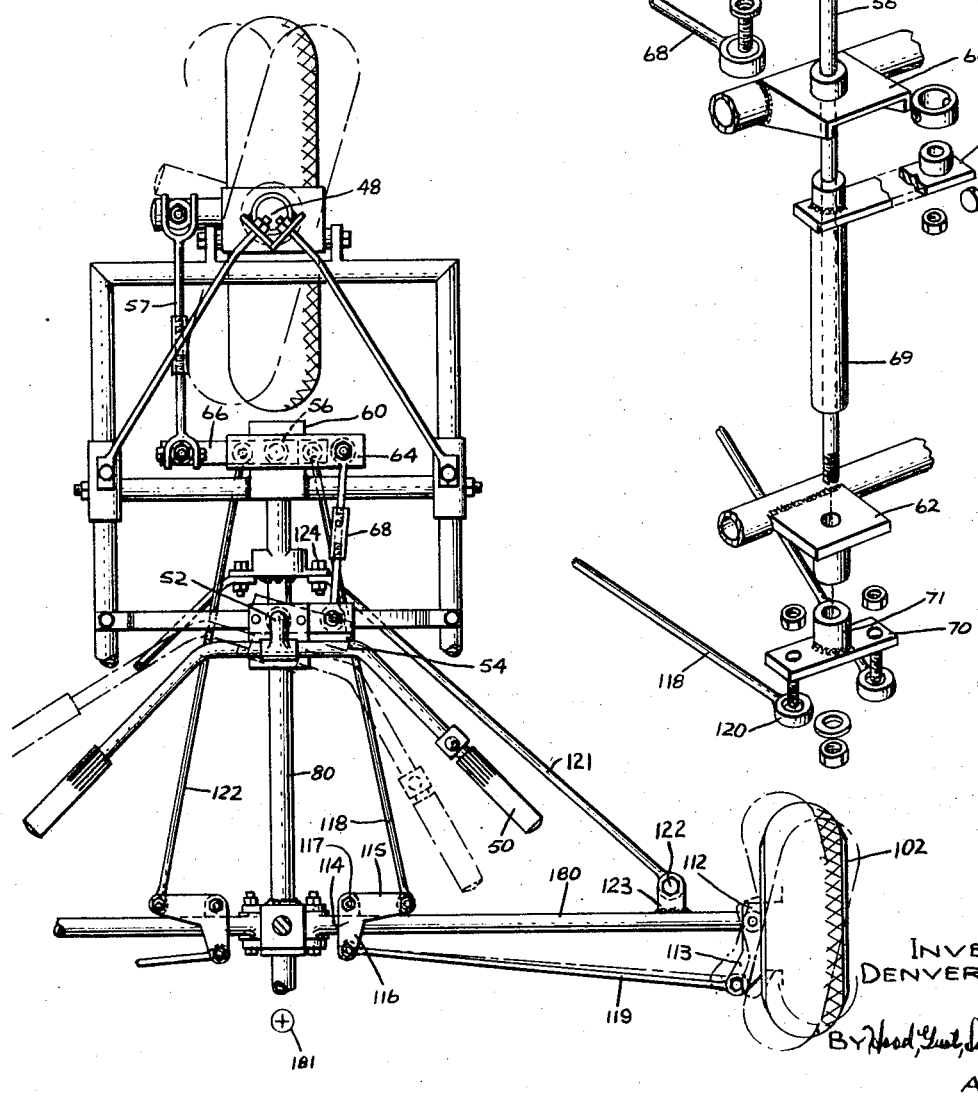

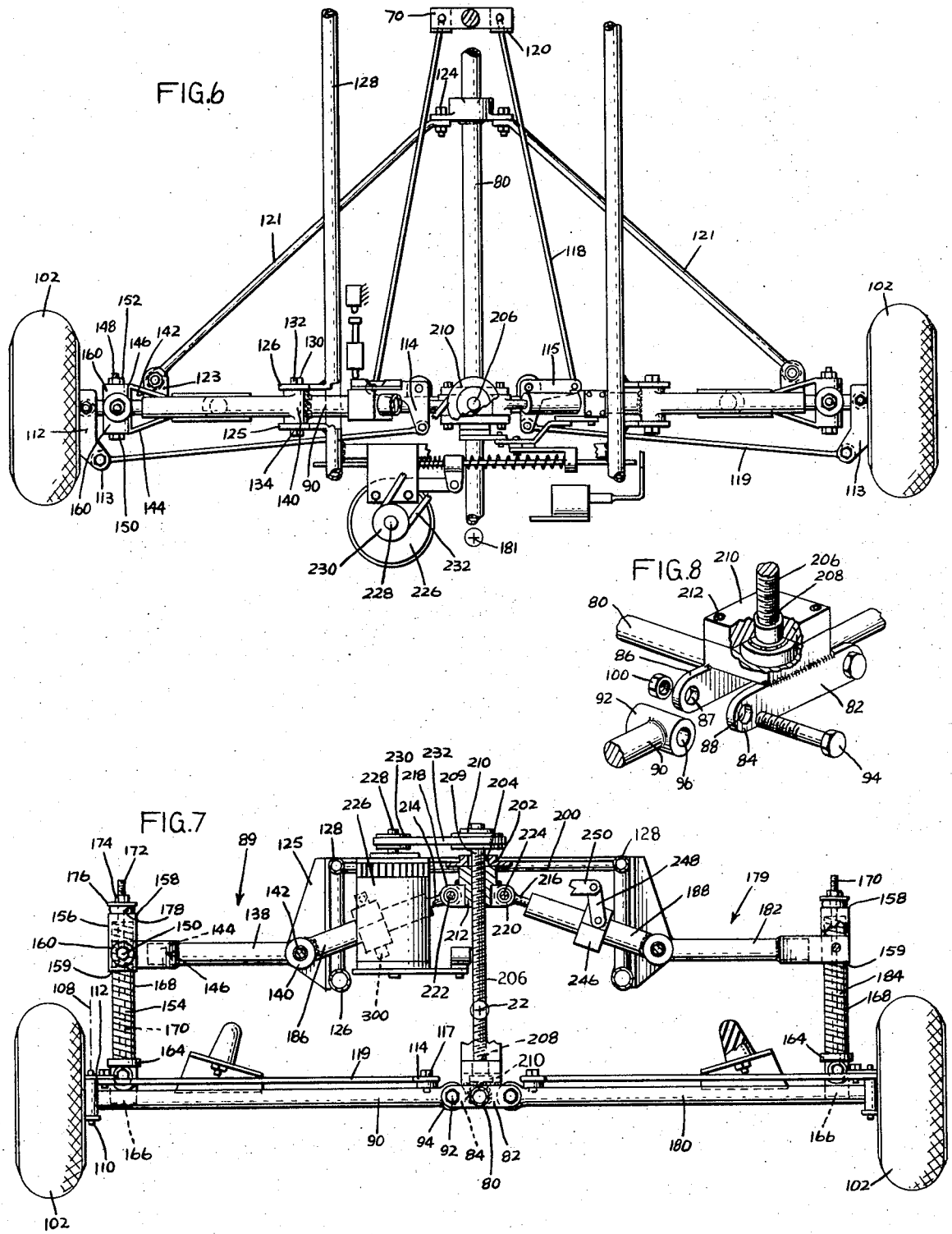

INVENTOR:
DENVER SUTTON,

BY Wood, Sust, Driel, Lundy & Coffey
ATTORNEYS.

INVENTOR:
DENVER SUTTON,

ATTORNEYS.

TANDEM WHEELED VEHICLE WITH STABILIZING APPARATUS

BACKGROUND OF THE INVENTION

1. Field of the Invention

The present invention relates to a tandem-wheeled motor vehicle and more particularly to such a vehicle having thereon a stabilizing apparatus which prevents tipping or tilting of the vehicle at low speeds and limits tilting of the vehicle at road speeds.

2. Description of the Prior Art

Tandem-wheeled motor vehicles such as motorcycles are presently widely used as utility and recreational vehicles. The load of the vehicle must be balanced on the wheels and the operator of the vehicle must manually support the vehicle in an upright position when the vehicle is traveling at a very low speed or is stopped. Correspondingly, because the operator must be able to place his feet upon the ground, such vehicles have not heretofore been provided with a body which encloses the driver to protect him from inclement weather or injury in the event of an accident. Furthermore, due to the significant weight of such vehicles, supporting such vehicles has required significant physical strength on the part of the operator.

A number of tandem-wheeled motor vehicles have been proposed which incorporate various forms of stabilizing wheels which can be manually operated to support the vehicle in an upright position. However, these prior art mechanisms require the conscious attention of the operator and, further, do not provide any stabilizing effect for the vehicle at normal road speeds either because the stabilizing wheels cannot be properly steered or do not retract properly to allow for normal tilting of the vehicle when it is being maneuvered at road speed.

SUMMARY OF THE INVENTION

The invention, in its broader aspects, is a motor vehicle having its supporting wheels arranged in tandem along the longitudinal axis thereof and a pair of stabilizing wheels which are disposed in bilaterally symmetrical spaced-apart relationship to the longitudinal axis of the vehicle. Strut means secure the wheels to the vehicle for verticle-swinging movement therewith between retracted and extended positions and there are means coupled between the wheels and the steering mechanisms of the vehicle for steering the wheels in synchronism with the steering mechanism of the vehicle in all positions of the stabilizing wheels between their retracted and extended positions. Motor means are provided, the motor means being coupled to the struts for moving the wheels between their retracted and extended positions, and there are switch means for selectively operating the motor means to retract and extend the wheels.

It is therefore an object of the present invention to provide a tandem-wheeled motor vehicle having an improved stabilizing apparatus thereon;

It is another object of the invention to provide such a tandem-wheeled vehicle which will remain in an upright position when the vehicle is moving at very low speeds or stopped;

It is yet another object of the invention to provide such a vehicle which has increased stability at road speeds;

It is still another object of the present invention to provide such a vehicle wherein operation of the stabilizing apparatus is fully automatic;

It is another object of the invention to provide a vehicle having a stabilizing apparatus which is fully steerable in synchronism with the steering mechanism of the vehicle; and It is still another object of the invention to produce such a vehicle which is reliable in operation and economical to manufacture.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side perspective view of the vehicle in accordance with the invention;

FIG. 2 is a side perspective view of the vehicle of FIG. 1 with the body thereof removed;

FIG. 3 is an elevational view of the vehicle as viewed from the front thereof;

FIG. 4 is a fragmentary top plan view of the front portion of the vehicle showing the steering mechanism;

FIG. 5 is an exploded view of a portion of the steering mechanism of the vehicle showing details thereof;

FIG. 6 is a fragmentary top plan view of the vehicle showing details of the strut assemblies and motor means;

FIG. 7 is a front elevational view of the strut assembly of the vehicle;

FIG. 8 is a partial exploded view of a portion of the strut assembly of FIG. 7;

FIG. 12 is a schematic diagram of the electrical system for controlling the motor means superimposed on a top phantom view of the vehicle;

DESCRIPTION OF THE PREFERRED EMBODIMENT

Figure 9:
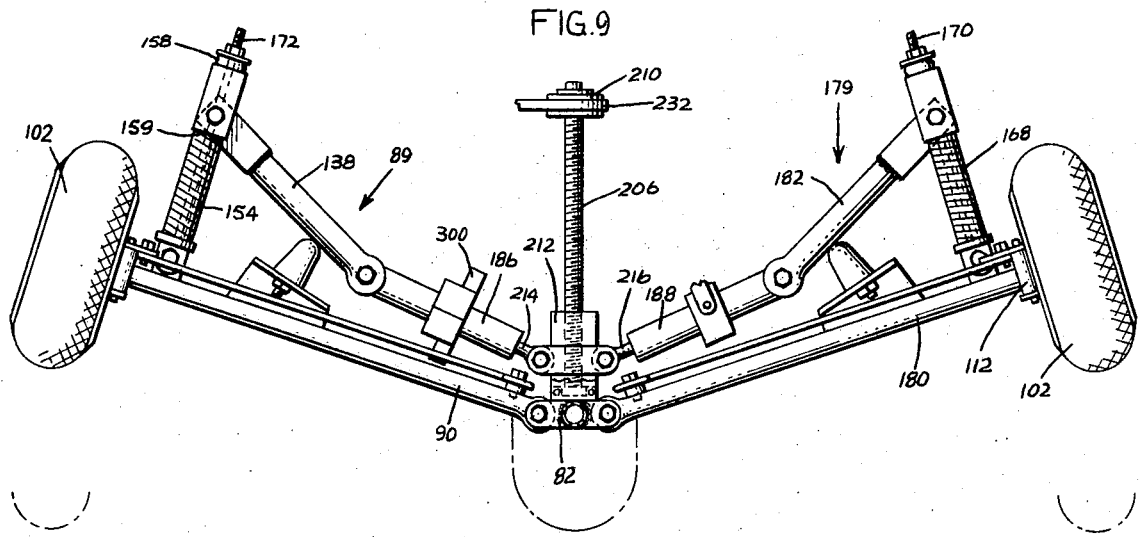
FIG. 9 is a front plan view similar to FIG. 7 showing the wheels in their retracted positions.

Referring now to the drawings, there is indicated generally at 10 a motor vehicle comprising a tubular frame 12 having a front fork assembly 14 pivotable about a generally vertical axis 48 and resiliently suspended rear fork assembly 16. A front wheel 18 and rear wheel 20 are carried for rotation on fork assemblies 14, 16, respectively, and are disposed in tandem along the longitudinal axis 22 of the vehicle 10.

A conventional gasoline engine 24 is carried within the rear half of frame 12 and provides power to drive rear wheel 20 by means of a speed-changing drive mechanism which includes chains 26 and 28 and sprockets 30 and 32 in conventional manner. Typically, the engine will be fitted with a multiple speed transmission 34 and manual shift linkage 36.

A seat 38 is secured to frame 12 and straddles longitudinal axis 22 of the vehicle 10 and the frame 12 is provided with an opening 40 which has the bottom thereof closed with a floor 42. A brake pedal 44 and operating cylinder 46 are operatively secured to the frame within opening 40.

As best seen in FIGS. 4 and 5, the vehicle is provided with a steering mechanism which includes a laterally extending handlebar 50 which rotates about vertically extending handlebar shaft 52. Secured to the lower end of shaft 52 is a crank arm 54 which is pivotable therewith. Midway between shaft 52 and pivot axis 48 of the front wheel 18 is an upright jack shaft 56 which is rotatably secured to the frame 12 with vertically spaced-apart, axially aligned bearing assemblies 60 and 62. A second crank arm 64 is fixedly secured to the upper end of the jack shaft 56 and an articulated link 68 couples the distal ends of arms 54 and 64 whereby movement of arm 54 will cause a corresponding movement of arm 64. A pitman arm 66 having a mounting sleeve 69 and double ended crank arm 70 having mounting hub 71 are received on and fixedly secured to the center and lower ends of jack shaft 56, respectively, also for pivotal movement therewith. A second articulated link 57 is coupled between the distal end of pitman arm 66 and front wheel fork 14 whereby steering movement of handlebar 50 causes turning or steering movement of front wheel 18. It will be apparent that lower crank arm 70 will move in synchronism with crank arm 66, and therefore, the movement of crank arm 70 is synchronized with the steering of the vehicle 10, the purpose of this crank arm 70 being explained below.

Referring now to FIGS. 6, 7, and 8, there is affixed to longitudinally extending lower frame member 80 adjacent the center or midpoint of frame 12, a hinge bracket 82 (FIG. 8) which includes two laterally extending, spaced-apart hinge plates 84 and 86. Plates 84, 86 have formed therein two pairs of axially aligned holes 87, 88, the holes of each pair having their axes aligned and extending in a direction parallel to longitudinal axis 22 of the vehicle 10.

Secured to one side of bracket 82 is strut assembly 89 which includes an elongated lower strut 90 having a hollow, cylindrical bearing hub 92 affixed transversely to the end thereof. Hub 92 has an axial dimension such that hub 92 is snugly, but slidingly received between hinge plates 84, 86. A threaded fastener 94 extends axially through holes 87, 88 and hub 92 and is fixedly secured with nut 100, whereby lower strut 90 is vertically pivotally movable about the axis of hub 92.

A pneumatic tire and wheel assembly 102 (FIG. 2) is rotatably secured to stub axle 104 (FIG. 2) with bolts 106 and the axle 104 is pivotally secured to the distal end of lower strut arm 90 by means of a conventional kingpin 110 and steering knuckle 112 having a lever arm 113, for movement about an axis 108 which extends vertically in transversely spaced-apart relationship to longitudinal axis 22 of the vehicle 10.

A bell crank 114 (FIG. 4) is provided with orthogonally disposed arms 115, 116 and pivotally secured to strut 90 with a hinge bolt 117. A pair of articulated links 118 and 119 couple arms 115, 116 of bell crank 114 to crank arm 70 and lever arm 113 of steering knuckle 112, respectively. Preferably, the ends of links 118 and 119 are fitted with suitable ball joints as at 120 (FIG. 5) to permit free swiveling movement of the links with respect to the lever arms. It is apparent that steering movement of handlebar 50 will produce a corresponding steering movement of wheel 102 by means of crank arm 70, bell crank 114, and articulated links 118, 119. By properly proportioning the lever arms 113, 115, and 116, wheel 102 will be caused to turn to follow a circle which is concentric with the circle being followed by the vehicle 10 when it is being turned. It is further apparent that steering movement of wheel 102 will occur at all positions of the strut assembly 89 between its retracted and extended positions whereby, when the strut assembly is retracted, if the vehicle tilts sufficiently to cause wheel 102 to engage the road surface, the wheel 102 will always be properly turned or steered to follow the course of the vehicle.

A trailing arm 121 is fixedly secured to the distal end of the lower strut arm 90 by means of a threaded fastener 122 and bolt pad 123 which is fixedly secured to the distal end of the strut arm 90 by welding. The opposite end of trailing arm 121 is hingedly secured to tubular frame member 80 by means of a shoulder bolt 124.

A pair of vertically extending, spaced-apart brackets 125, 126 are secured to longitudinally extending members 126 and 128 of frame 12 as by welding. An axle 130 (FIG. 6) having an enlarged head 132 passes through brackets 125, 126 with its axis parallel to longitudinal axis 22 of the vehicle and is secured with a threaded fastener 134.

An upper strut arm 138 has a hollow, cylindrical hub portion 140 which is rotatably received on axle 130. The distal end of arm 138 has a pair of brackets 142, 144 secured thereto as by welding to form a fork 146 and a pair of axially aligned holes (not shown) are formed through brackets 142, 144, and a hinge pin 148 having an enlarged head 150 is received therethrough and secured with a threaded fastener 152.

A longitudinally deformable link 154 is pivotally secured between the distal ends of lower arm 90 and upper arm 138. This link includes a hollow, cylindrical socket member 156 having a closed end 158, open end 159, and a pair of laterally extending cylindrical hubs 160. The socket 156 is pivotally received on pin 148 as shown with closed end 158 disposed generally vertically from the distal end of arm 138. The lower end of link 154 comprises a T-shaped hinge bracket 164 which is pivotally secured to hinge bracket 166 which in turn is secured to the distal end of lower arm 90 as by welding. A helical compression spring 168 is received within socket member 156 and has the lower end thereof resting upon the upper surface of hinge bracket 164. The spring is held in position by an elongated rod 170 secured to bracket 164 which has a threaded end 172 extending upwardly through closed end 158 of socket member 156. A threaded fastener 174, flat washer 176, and resilient grommet 178 are fitted to the upper end of rod 170 with threaded fastener 174 being tightened thereon to partially compress spring 168 between hinge bracket 164 and socket 156.

It can thus be seen that lower arm member 90, upper arm 138 and longitudinally deformable link or spring assembly 154 form a strut assembly 89 capable of vertical-swinging movement with respect to and about longitudinal axis 22 of the vehicle. Further, axle 104 and wheel 102 are maintained in a position in which the axis lies in a plane which includes lower arm member 90, whereby when the vehicle tilts, wheel 102 will always be in a vertical position when it engages the road surface.

A second strut assembly 179 includes lower strut 180, upper arm 182 and longitudinally deformable link 184 and is secured to the opposite side of the vehicle frame 12. This strut assembly 179 is in all other respects identical to assembly 89 and requires no further description.

To provide maximum stability, the strut assemblies 89, 179 are secured to the vehicle 10 at a point along the longitudinal axis 22 a small dimension forwardly of the center of gravity 181 of the vehicle 10, it being apparent that the effective upsetting or roll center of the vehicle will, when wheels 102 engage the road, be shifted a small dimension forwardly of the center of gravity thereof by reason of the frictional forces and resulting drag of wheels 102. Correspondingly, maximum support or roll resistance is achieved by placing the wheels 102 laterally of the effective roll center of the vehicle.

Fixedly secured to hub 140 of the upper arm 138 is a tubular lever arm 186 which extends inwardly of and between longitudinal frame members 126, 128 a distance less than half the width of the vehicle frame. A similar lever arm 188 is secured to upper arm member 182 of the oppositely disposed strut assembly 179.

Frame 12 is provided with laterally extending members 200 which extend between longitudinal frame members 128 positioned in generally vertical alignment with hinge bracket 82, and a flanged bearing 202 is secured to frame members 200 in vertical alignment with longitudinal axis 22 of the vehicle 10. An elongated screw 206 has its lower end 208 rotatably secured to hinge block 82 by means of bearing block 210 secured thereto with threaded fasteners 212 (FIG. 8). The upper end 209 of screw 206 is rotatably carried by flanged bearing 202 and has a pulley 210 drivingly affixed thereto.

A threaded collar 212 is received on screw 206 as shown, and a pair of rods 214 and 216 are telescopically received in lever arms 186, 188, respectively, these rods 214, 216 having their distal ends pivotably secured to threaded collar 212 by means of brackets 218, 220 and hinge pins 222, 224. It is apparent that threaded collar 212 is restrained against rotation by rod members 214, 216 whereby, when screw 206 is rotated, collar 212 will be caused to move axially in a vertical direction thereon. Correspondingly, lever arms 186, 188 will be forcibly moved upwardly and downwardly producing vertical-swinging movement of the strut assemblies 89, 179 between positions shown in FIGS. 7 and 9.

To drive elongated screw 206, there is provided a direct current electric motor 226 which has its output shaft 228 disposed in parallel spaced-apart relationship to screw 206. A pulley 230 is drivingly secured to output shaft 228 and an endless drive element 232, such as a V-belt or a chain, is drivingly fitted to pulleys 210, 230, whereby rotation of output shaft 228 of motor 226 will cause rotation of screw 206 and correspondingly, vertical-swinging movement of the strut assemblies 89, 179.

This motor 226 is selected to be operable from the standard direct current power supply of the vehicle, i.e., the vehicle battery 281 and generator (not shown), and may be a conventional automobile starter motor.

Figure 11:
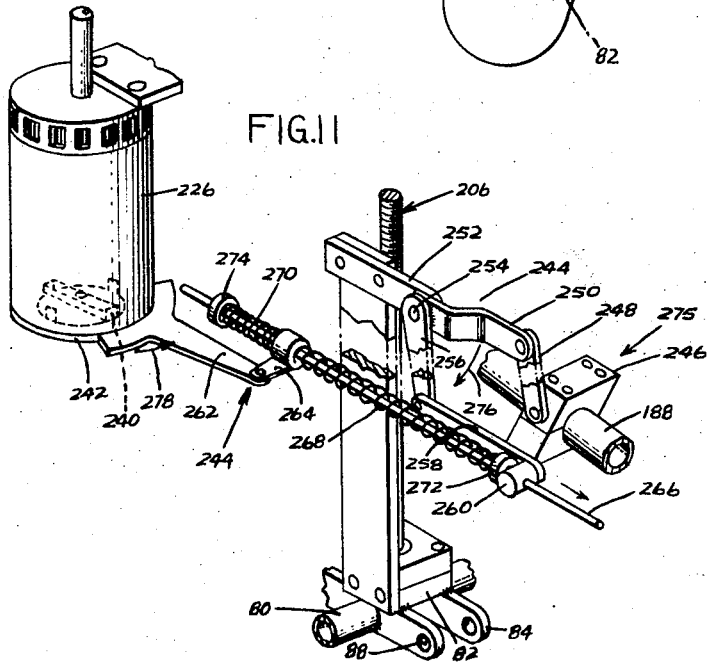
FIG. 11 is a fragmentary perspective view showing details of the motor-reversing mechanism of the vehicle.
Figure 13:
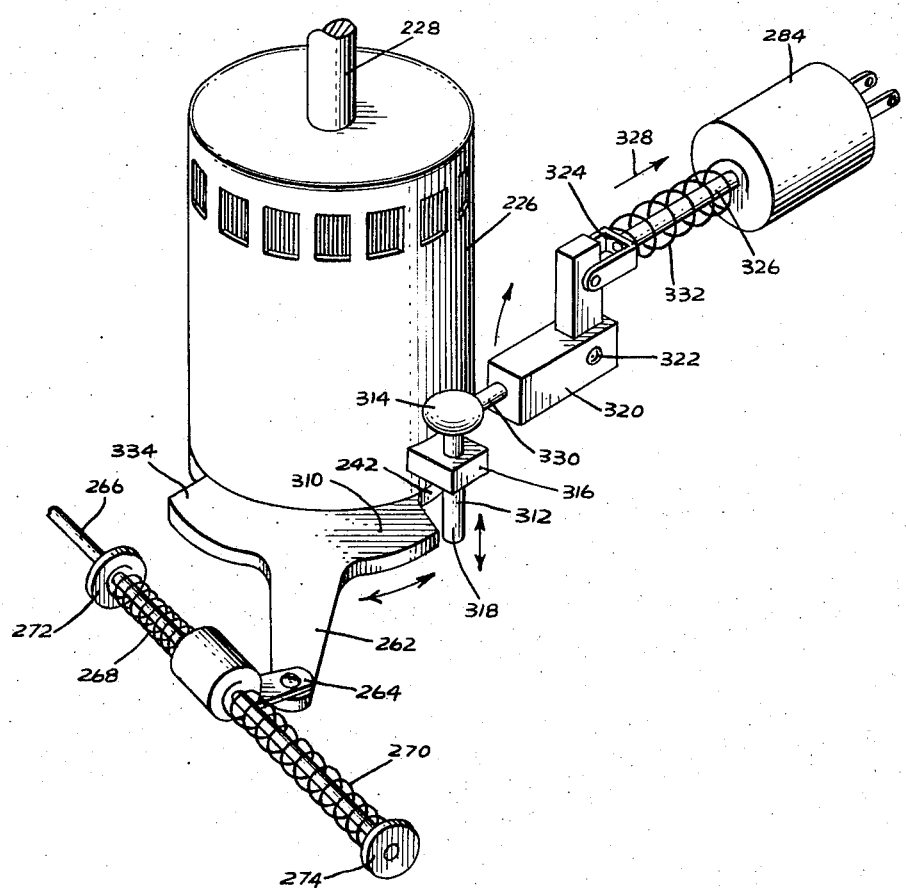
FIG. 13 is a perspective view of the motor means of the vehicle showing details of its construction.
Figure 13A:
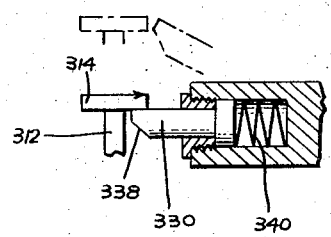
FIG. 13a is a partial cut-away view of a latch mechanism used on the motor means.

Referring now to FIGS. 11, 13, and 13a, motor 226 includes a plurality of brushes indicated by dashed lines 240 for supplying electrical current to the rotor thereof. To enable the motor 226 to be reversed, i.e., to rotate in the opposite directions in response to electrical current applied thereto, the end 242 of motor 226 is made rotatable and the brushes of the motor 240 secured thereto, whereby, when end 242 is rotated, the position of the brushes 240 with respect to the rotor and commutator thereof (not shown) will be shifted, thus reversing the polarity of voltage applied thereto in well known manner. For example if the motor is a four pole motor, rotating end 242 and correspondingly the brushes 240, 90° will reverse the polarity of the voltage applied to the windings of the motor causing it to rotate in the opposite direction. To rotate end 242, and thereby rotate the brushes of the motor, there is provided a brush shifting linkage 244 which is operatively coupled between lever arm 188 of strut assembly 179 and end 242 of motor 226. This linkage includes a hinge block 246 which is rigidly secured to lever arm 188, a pivotable link 248 hingedly secured to a bell crank 250 which is in turn pivotably secured to frame 12 of the vehicle with mounting bracket 252 and hinge pin 254. Bell crank 250 includes an orthogonally disposed arm 256 which has pivotably secured thereto a drag link 258 the distal end of which is provided with a collar 260. End 242 of motor 226 is similarly provided with a lever arm 262 as shown, the distal end of lever arm 262 having an articulated collar assembly 264 secured thereto. A push rod 266 is secured at one end thereof to links 258 by means of set screw collar 260 and is coupled at its opposite end to assembly 264. A pair of helical compression springs 268 and 270 are fitted about push rod 266 adjacent opposite sides of assembly 264, springs 268, 270 being held in position by means of collar 274.

Assuming that the wheels are in their extended or down position as illustrated in FIG. 7, it will be seen that as lever arm 188 moves downwardly (causing strut assembly 179 to move upwardly) as indicated by arrow 275, bell crank 250 is caused to rotate as indicated by arrow 276 pulling link 258 to the left as viewed in the drawing. As link 258 moves to the left, collar 260 moves therewith moving rod 266 also to the left to exert force against lever arm 262 of end 242 of motor 226 via compression spring 268, collar 274, and collar assembly 264. As best seen in FIG. 13, end 242 of motor 226 is provided with a radially extending, arcuate detent plate 310. A vertically movable detent pin 312 having an enlarged head 314 is slidably secured to motor 226 by means of a bearing block 316. The lower end 318 of pin 312 engages an end surface of detent plate 310 whereby end 242 of motor 226 is prevented from rotating thereby. Because end 242 is prevented from rotating by pin 312, spring 268 is unable to rotate end 226 to reverse rotation of the motor and the energy in spring 268 is retained as energy. A bell crank 320 is secured to the frame of the vehicle with a suitable bracket (not shown) for pivotal movement about a hinge pin 322. The upwardly extending (as viewed in FIG. 13) arm of bell crank 320 is operatively coupled to solenoid 284 with a suitable linkage 324 whereby, when solenoid 284 is energized, its shaft 326 is drawn inwardly thereof as indicated by arrow 328 causing bell crank 320 to rotate about hinge pin 322. The horizontally extending arm of bell crank 320 is provided with a spring biased detent plunger 330 which, when bell crank 320 is in the position shown in FIG. 13, engages the undersurface of enlarged head portion 314 of pin 312. It will thus be apparent that when solenoid 284 is energized to pivot bell crank 320, plunger 330 lifts detent pin 312 upwardly and out of engagement with detent plate 310 at which time compressed spring 268 operates to rotate end 242 of the motor. As can be seen in FIG. 13a, bell crank 320 is proportioned such that, when bell crank 320 pivots to the position indicated in dotted lines, plunger 330 slides out of engagement with the enlarged head 314 of pin 312 releasing same. Thus, when detent plate 310 has rotated approximately 90°, pin 312 is able to return to its lowered position wherein it engages the opposite end 334 of detent plate 310 preventing rotation of end 242 of motor 226 in the respectively opposite direction. To permit bell crank 320 to return to a ready condition wherein plunger 330 engages the under surface of head portion 314, plunger 330 is provided with a beveled end 338 whereby, when bell crank 320 is forced downwardly by spring 326, beveled end 338 of plunger 330 engages enlarged head portion 314 forcing plunger 330 inwardly. When plunger 330 reaches a position wherein it clears enlarged head portion 314 it will of course move into its extended position by reason of compression spring 340 (FIG. 13a).

It will be apparent that when lever arm 188 moves upwardly the above procedure will be reversed and compression spring 270 will be compressed to provide driving force to rotate end 242 of motor 226 in the respectively opposite direction upon upward movement of pin 312.

Referring now to FIG. 12 there is illustrated the electrical schematic of the circuit for operating motor 226. The circuit is provided with a primary power circuit 283 which includes conductor 280 serially connected between the positive terminal 282 of the battery s batter 281 and one power terminal 285 of solenoid 284. A second conductor extends from a second power terminal 287 of solenoid 284 to positive terminal 286 of the motor 226, the opposite terminal 288 of motor 226 being grounded.

A control circuit 289 includes serially connected conductor 290, key operated switch 292, manually operated, normally open push button switch 294 and coil terminal 295 of solenoid 284. A second pair of contacts 296 are connected in parallel with push button switch 294 as shown.

Contacts 296 are provided with a mechanical plunger mechanism 298 which is operatively engaged by a cam 300, cam 300 being fixedly secured to lever arm 138 of strut assembly 89. The cam is positioned such that the high lobes 302 thereof depress plunger mechanism 298 when strut assembly 89 is at either extreme of its motion, depression of plunger mechanism 298 opening contacts 296. At all positions of strut assembly 89 between the extremities of its movement, plunger mechanism 298 is released and contacts 296 are closed.

When key switch 292 is rotated to close the circuits between battery terminal 282 and push button 294, depression of push button switch 294 will connect the coil of solenoid 284 to the battery causing the solenoid 284 to operate, and close its power contacts (not shown). Actuation of solenoid 284 releases detent pin 312 permitting the end 242 of motor 226 to rotate as described above whereby motor 226 will, when current is applied thereto, rotate in the opposite direction than during its last operation. This will of course be the proper direction to move the strut assemblies 89, 179 to the opposite extremity of their movement. When the power contacts of solenoid 284 close, electrical energy from the battery 281 is applied therethrough to positive terminal 286 of motor 226 causing it to rotate. As the motor begins to rotate, and assuming that the wheels are in their retracted (up) position, cam 300 will be moved by means of lever arm 138 causing plunger 298 to be released closing contacts 296. Closure of contacts 296 maintains the control winding of the solenoid 284 in an operative condition and maintains the power contacts of the solenoid closed. As lever arm 138 approaches the limit of its movement, cam 300 again depresses plunger 298 opening contacts 296 and breaking the circuit to the control winding of solenoid 284. This interrupts the application of power to motor 226 causing it to stop. As previously described, linkage assembly 244 will have compressed spring 268 or 275 whereby end 242 of motor 226 will now adapt to rotate in the opposite direction upon the next depression of push button switch 294.

It will be apparent that a speed-sensitive switch can also be coupled to the wheels of the vehicle whereby operation of the wheels from their extended to retracted positions and vice versa can be effected automatically in response to the speed of the vehicle.

Figure 10:
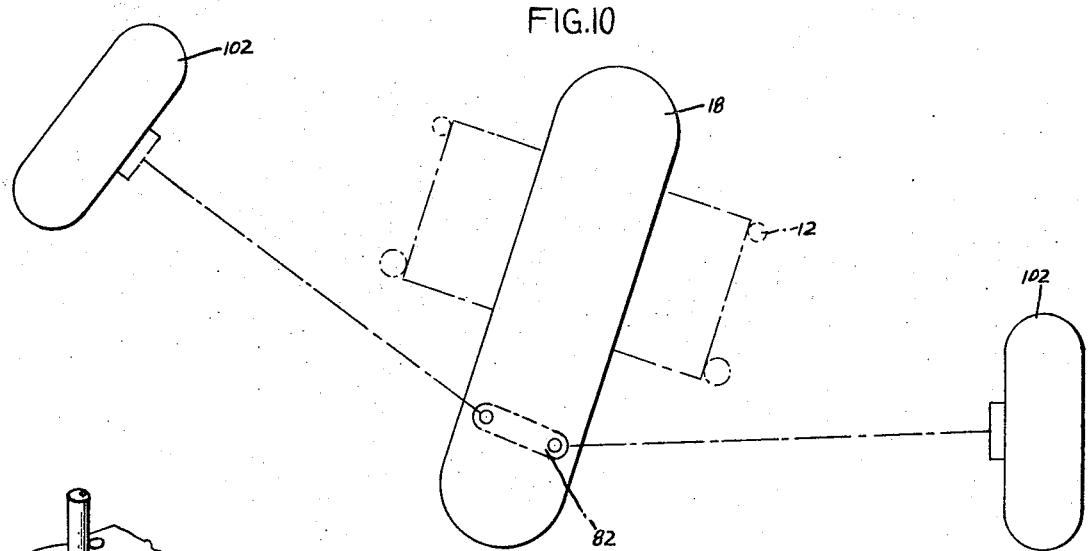
FIG. 10 is a front schematic representation of the wheels of the vehicle showing their relative positions when the vehicle is tilted.

It will also be observed that due to the geometry of the stabilizing wheels and strut assemblies 89 and 179, the stabilizing wheels 102 will provide an effective tilt-limiting device which further enhances the stability of the vehicle at road speeds. Similarly, because the wheels 102 are steerable in synchronism with the steering mechanism of the vehicle 10, intermittent engagement of the wheels 102 with the road surface when the vehicle tilts as shown in FIG. 10 will not adversely affect the steering of the vehicle or cause loss of control thereof since these wheels will always be pointed in a direction to follow the line of travel of the vehicle.

By reason of the stabilizing apparatus, it is not necessary for the operator to have his feet and legs free to engage the ground and support the vehicle when it is operating at low speeds or stopped, and thus it becomes a simple matter to provide the vehicle with a suitable body 310 as shown in FIG. 2, whereby the operator will be given added protection in the event of an accident and will be protected from inclement weather.

At the same time, the vehicle of the present invention retains all of the advantages of tandem-wheeled vehicles by reason of its reduced width, light weight construction, and ability to operate over rough terrain.

While there have been described above the principles of this invention in connection with specific apparatus, it is to be clearly understood that this description is made only by way of example and not as a limitation to the scope of the invention.

What is claimed is:

1. For use in a motor vehicle which has the wheels thereof arranged in tandem along the longitudinal axis of the vehicle, a steering mechanism, and a supporting frame, a stabilizing apparatus comprising a pair of wheels disposed in bilaterally symmetrical spaced-apart relationship to the longitudinal axis of the vehicle, strut means for securing said wheels to the vehicle for vertical-swinging movement between retracted and extended positions, means coupled between said wheels and the steering mechanism of the vehicle for steering said wheels in synchronism with the steering mechanism of the vehicle in all positions of said wheels between said retracted and extended positions, motor means coupled to said struts for moving said wheels between said retracted and extended positions, and switch means for selectively operating said motor means to retract and extend said wheels.

2. The apparatus of claim 1 wherein said strut means secures said wheels to the vehicle for vertical-swinging movement about an axis generally parallel to the longitudinal axis of the vehicle and at an essentially constant dimension therefrom, tilting movement of the vehicle being limited by said wheels in all positions thereof between said retracted and extended positions.

3. The apparatus of claim 2 wherein said strut means comprises a pair of oppositely disposed arm assemblies secured to the frame of the vehicle for vertical-swinging movement with respect thereto, each of said assemblies including an upper arm and a lower arm disposed in vertical spaced-apart relationship, each of said arms having one end thereof hingedly secured to the frame of the vehicle, a respective one of said wheels being secured to the distal end of said lower arm, and a longitudinally, resiliently deformable link pivotably secured between the distal ends of said upper and said lower arms, respectively.

4. The assembly of claim 3 wherein said arm assemblies further include a lever member rigidly attached to the proximal ends of said upper arms and extending therefrom in a direction generally oppositely the distal ends thereof.

5. The apparatus of claim 4 wherein said motor means includes a direct current electric motor having an output shaft, an elongated screw extending vertically through the longitudinal axis of said vehicle at a point thereon between said lever arms, said screw being operatively coupled to the output shaft of said electric motor for rotation therewith, a collar threadedly received on said screw, said collar being secured against rotation with said screw whereby rotation of said screw causes vertical movement of said collar thereon, and a pair of longitudinally extensible links coupling said collar to said lever arms, whereby vertical movement of said collar causes movement of said lever arms to move said arm assemblies between said retracted and extended positions.

6. The assembly of claim 5 wherein each of said longitudinally extensible links comprises a rod hingedly secured to said collar and telescopically received within a respective one of said lever arms for reciprocal movement therein.

7. The apparatus of claim 1 wherein said wheels are mounted on axles disposed forwardly adjacent the center of gravity of said vehicle.

8. The apparatus of claim 1 wherein said strut means further includes suspension means for resiliently supporting said wheels on said struts.

9. The apparatus of claim 1 wherein said motor means includes a direct current electric motor, said motor including a plurality of brushes, a rotor, and a plurality of electrical poles, and said switch means includes a manually operable switch serially connected between said electric motor and the source of direct current electrical energy on said vehicle and means coupled between one of said arms of said assemblies and the brushes of said motor for moving said brushes between first and second positions with respect to the poles of said motor, the rotation of said motor being in one direction when said brushes are in said first position and in the position direction when said brushes are in said second position, respectively.

10. The apparatus of claim 9 wherein said brush rotating means includes a rotatable portion of the housing of said motor and a mechanical linkage coupling said rotatable housing portion to one of said arm assemblies, said mechanical linkage including spring means for moving said rotatable portion, said spring means biasing said rotatable portion toward said first position when said arm assembly is in its extended position and toward said second position when said arm assembly is in said retracted position, said spring means being operable to rotate said rotatable portion in response to operation of said manually operable switch.

11. The apparatus of claim 10 wherein said manually operable switch is a momentary contact switch, said switch means further including a second switch having an actuating plunger and a switch-actuating cam operatively engaged with said plunger, said switch and said cam being secured to opposite ones of the frame of the vehicle and the other of said arm assemblies, said cam having two oppositely disposed high surface extremities and a central low extremity, said high cam extremities opening said second switch and said low cam extremity closing said switch, one of said high cam extremities engaging said plunger when said arm assembly is in its extended position and the other of said cam extremities engaging said plunger when said arm assembly is in its retracted position, said low cam extremity engaging said plunger in all other positions of said arm assemblies between said extended and retracted positions.

12. The apparatus of claim 1 wherein said means for steering said wheels includes a first crank arm having oppositely disposed ends, said crank being secured to the steering mechanism of the vehicle and rotatable therewith, a pair of bell cranks hingedly secured to said arm assemblies, said bell cranks each having a first arm extending generally parallel to the longitudinal axis of said vehicle and a second arm extending generally perpendicular to said first arm, a first pair of articulated links extending between the distal ends of said crank arm and respective ones of said second arms, and a second pair of articulated links coupling each of said first arms to a respective one of said wheels, respectively.

13. The apparatus of claim 12 wherein said articulated links have at least one end thereof provided with a ball joint.

14. The apparatus of claim 13 wherein said crank arm and said bell cranks are proportioned such that, when said vehicle is steered to follow a circle of predetermined radius, said wheels are steered to follow circles concentric with said circle.

* * * * *

UNITED STATES PATENT OFFICE
CERTIFICATE OF CORRECTION

Patent No. 3,700,059            Dated October 24, 1972

Inventor(s) Denver Sutton

It is certified that error appears in the above-identified patent and that said Letters Patent are hereby corrected as shown below:

IN THE CLAIMS

Claim 9, Column 10, Line 19 change "position" to --- opposite ---

Signed and sealed this 29th day of May 1973.

(SEAL)
Attest:

EDWARD M. FLETCHER, JR.　　　　　　ROBERT GOTTSCHALK
Attesting Officer　　　　　　　　　　Commissioner of Patents